United States Patent
Jung et al.

(10) Patent No.: US 12,395,960 B2
(45) Date of Patent: Aug. 19, 2025

(54) METHOD AND APPARATUS FOR HANDLING RESOURCE COLLISION BETWEEN MULTIPLE NETWORKS IN WIRELESS COMMUNICATION SYSTEM

(71) Applicant: LG ELECTRONICS INC., Seoul (KR)

(72) Inventors: Sunghoon Jung, Seoul (KR); Hongsuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 18/019,072

(22) PCT Filed: Jul. 30, 2021

(86) PCT No.: PCT/KR2021/010003
§ 371 (c)(1),
(2) Date: Jan. 31, 2023

(87) PCT Pub. No.: WO2022/025717
PCT Pub. Date: Feb. 3, 2022

(65) Prior Publication Data
US 2023/0319754 A1    Oct. 5, 2023

(30) Foreign Application Priority Data

Jul. 31, 2020  (KR) .......................... 1020200095809

(51) Int. Cl.
*H04W 60/04*  (2009.01)
*H04W 68/02*  (2009.01)

(52) U.S. Cl.
CPC ........... *H04W 60/04* (2013.01); *H04W 68/02* (2013.01)

(58) Field of Classification Search
CPC ..... H04W 60/04; H04W 68/02; H04W 76/27; H04W 60/005; H04W 8/183; H04W 48/16; H04W 68/00; H04W 88/06; Y02D 30/70
See application file for complete search history.

(56) References Cited

U.S. PATENT DOCUMENTS

| | | | |
|---|---|---|---|
| 10,623,946 B1 | 4/2020 | Kumar et al. | |
| 2013/0109382 A1* | 5/2013 | Patwardhan | H04W 4/70 455/435.1 |

(Continued)

FOREIGN PATENT DOCUMENTS

| | | |
|---|---|---|
| CN | 103458417 | 12/2013 |
| CN | 110024444 | 7/2019 |

(Continued)

OTHER PUBLICATIONS

The State Intellectual Property Office of the People's Republic of China Application Serial No. 202180057711.0, Office Action dated May 14, 2024, 12 pages.

(Continued)

*Primary Examiner* — Ashley Shivers
(74) *Attorney, Agent, or Firm* — LEE, HONG, DEGERMAN, KANG & WAIMEY

(57) ABSTRACT

The present disclosure relates to handling a resource collision between multiple networks in wireless communications. According to an embodiment of the present disclosure, a method performed by a wireless device in a wireless communication system comprises: performing a registration procedure to be registered in a first network and a second network; receiving, from the second network, timing information related to the second network comprising a time period; and performing an idle mode operation in the first network in the time period while skipping to monitor scheduling information for the second network in the time (Continued)

period, wherein the idle mode operation comprises at least one of: monitoring a paging; performing a random access; or performing an idle mode measurement.

15 Claims, 16 Drawing Sheets

(56) References Cited

U.S. PATENT DOCUMENTS

| | | | |
|---|---|---|---|
| 2015/0017982 | A1 | 1/2015 | Klatt |
| 2015/0038154 | A1 | 2/2015 | Ponukumati |
| 2018/0331705 | A1 | 11/2018 | Ghani et al. |
| 2020/0196273 | A1 | 6/2020 | Ozturk et al. |
| 2020/0396793 | A1* | 12/2020 | Tiwari ............... H04W 60/02 |

FOREIGN PATENT DOCUMENTS

| | | |
|---|---|---|
| CN | 110446259 | 11/2019 |
| CN | 110574466 | 12/2019 |
| CN | 110831148 | 2/2020 |
| CN | 111263438 | 6/2020 |
| KR | 10-2017-0044654 | 4/2017 |
| WO | 2017136078 | 8/2017 |
| WO | 2018161244 | 9/2018 |
| WO | 2020111912 | 6/2020 |

OTHER PUBLICATIONS

Vodafone, "KI#2: New solution: Resolving paging occasion conflict in EPS using offset to the UE Identity Index Value," SA WG2 Meeting #139E, S2-2004218, May 2020, 3 pages.

Qualcomm Incorporated et al., "Solution for paging collision avoidance," SA WG2 Meeting #139E, S2-2003894, May 2020, 5 pages.

3rd Generation Partnership Project (3GPP), "Technical Specification Group Services and System Aspects; Study on system enablers for devices having multiple Universal Subscriber Identity Modules (USIM) (Release 17)," 3GPP TR 23.761 V0.4.0, Jun. 2020, 79 pages.

3rd Generation Partnership Project (3GPP), "Technical Specification Group Radio Access Network; NR; User Equipment (UE) procedures in Idle mode and RRC Inactive state (Release 16)," 3GPP TS 38.304 V16.1.0, Jul. 2020, 41 pages.

3rd Generation Partnership Project (3GPP), "Technical Specification Group Radio Access Network; NR; User Equipment (UE) procedures in Idle mode and RRC Inactive state (Release 16)" 3GPP TS 38.304 V16.0.0, Mar. 2020, 38 pages.

PCT International Application No. PCT/KR2021/010003, International Search Report dated Nov. 5, 2021, 2 pages.

Korean Intellectual Property Office Application No. 10-2023-7002944, Office Action dated Apr. 30, 2025, 7 pages.

* cited by examiner

METHOD AND APPARATUS FOR HANDLING RESOURCE COLLISION BETWEEN MULTIPLE NETWORKS IN WIRELESS COMMUNICATION SYSTEM

CROSS-REFERENCE TO RELATED APPLICATIONS

This application is the National Stage filing under 35 U.S.C. 371 of International Application No. PCT/KR2021/010003, filed on Jul. 30, 2021, which claims the benefit of earlier filing date and right of priority to Korean Application No. 10-2020-0095809, filed on Jul. 31, 2020, the contents of which are all incorporated by reference herein in their entirety.

TECHNICAL FIELD

The present disclosure relates to handling a resource collision between multiple networks in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In communication systems, a UE may be registered to multiple networks. In this case, a resource collision between the multiple networks may occur.

SUMMARY

An aspect of the present disclosure is to provide method and apparatus for method and apparatus for handling a resource collision between multiple networks in a wireless communication system.

Another aspect of the present disclosure is to provide method and apparatus for handing a resource collision for a MUSIM device in a wireless communication system.

Yet another aspect of the present disclosure is to provide method and apparatus for a UE-assisted handling of resource collision in a wireless communication system.

According to an embodiment of the present disclosure, a method performed by a wireless device in a wireless communication system comprises: performing a registration procedure to be registered in a first network and a second network; receiving, from the second network, timing information related to the second network comprising a time period; and performing an idle mode operation in the first network in the time period while skipping to monitor scheduling information for the second network in the time period, wherein the idle mode operation comprises at least one of: monitoring a paging; performing a random access; or performing an idle mode measurement.

According to an embodiment of the present disclosure, a wireless device in a wireless communication system comprises: a transceiver; a memory; and at least one processor operatively coupled to the transceiver and the memory, and configured to: perform a registration procedure to be registered in a first network and a second network, control the transceiver to receive, from the second network, timing information related to the second network comprising a time period, and perform an idle mode operation in the first network in the time period while skipping to monitor scheduling information for the second network in the time period, wherein the idle mode operation comprises at least one of: monitoring a paging; performing a random access; or performing an idle mode measurement.

According to an embodiment of the present disclosure, a non-transitory computer-readable medium has stored thereon a plurality of instructions. The plurality of instructions, when executed by a processor of a wireless device, cause the wireless device to: perform a registration procedure to be registered in a first network and a second network, receive, from the second network, timing information related to the second network comprising a time period, and perform an idle mode operation in the first network in the time period while skipping to monitor scheduling information for the second network in the time period, wherein the idle mode operation comprises at least one of: monitoring a paging; performing a random access; or performing an idle mode measurement.

According to an embodiment of the present disclosure, a memory of a wireless device in a wireless communication system stores a software code which implements instructions that, when executed by a processor for the wireless device, perform operations comprising: performing a registration procedure to be registered in a first network and a second network; receiving, from the second network, timing information related to the second network comprising a time period; and performing an idle mode operation in the first network in the time period while skipping to monitor scheduling information for the second network in the time period, wherein the idle mode operation comprises at least one of: monitoring a paging; performing a random access; or performing an idle mode measurement.

According to an embodiment of the present disclosure, a method performed by a base station (BS) in a first network in a wireless communication system comprises: performing a procedure for registering a wireless device in the first network, wherein the wireless device is registered in the first network and a second network; receiving, from the wireless device, timing information related to the second network; and transmitting, to the wireless device, timing information related to the first network comprising a time period in which the wireless device skips monitoring scheduling information for the first network to perform an idle mode operation in the second network in the time period, wherein the timing information related to the first network is determined based on the timing information related to the second network, and wherein the idle mode operation comprises at least one of: monitoring a paging; performing a random access; or performing an idle mode measurement.

According to an embodiment of the present disclosure, a base station (BS) in a first network in a wireless communication comprises: a transceiver; a memory; and at least one processor operatively coupled to the memory and the transceiver, wherein the at least one processor is configured to: perform a procedure for registering a wireless device in the first network, wherein the wireless device is registered in the first network and a second network, control the transceiver to receive, from the wireless device, timing information related to the second network, and control the transceiver to transmit, to the wireless device, timing information related to the first network comprising a time period in which the wireless device skips monitoring scheduling information for the first network to perform an idle mode operation in the second network in the time period, wherein the timing information related to the first network is determined based on the timing information related to the second network, and wherein the idle mode operation comprises at least one of: monitoring a paging; performing a random access; or performing an idle mode measurement.

The present disclosure can have various advantageous effects.

For example, collision between resources from multiple networks to which a UE is registered can be avoided.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
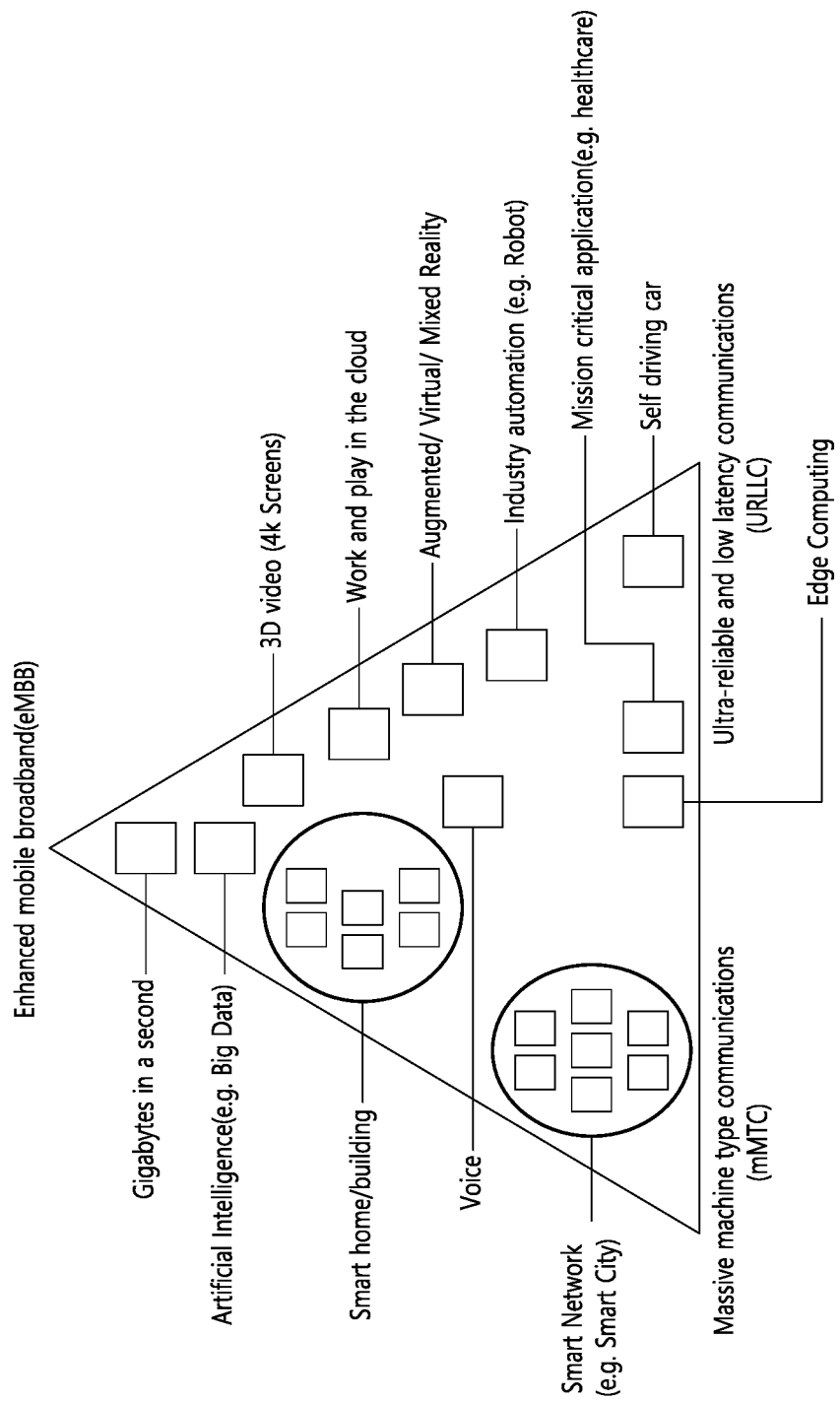
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', 'channel state/reference signal received power (RSRP)' and 'reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
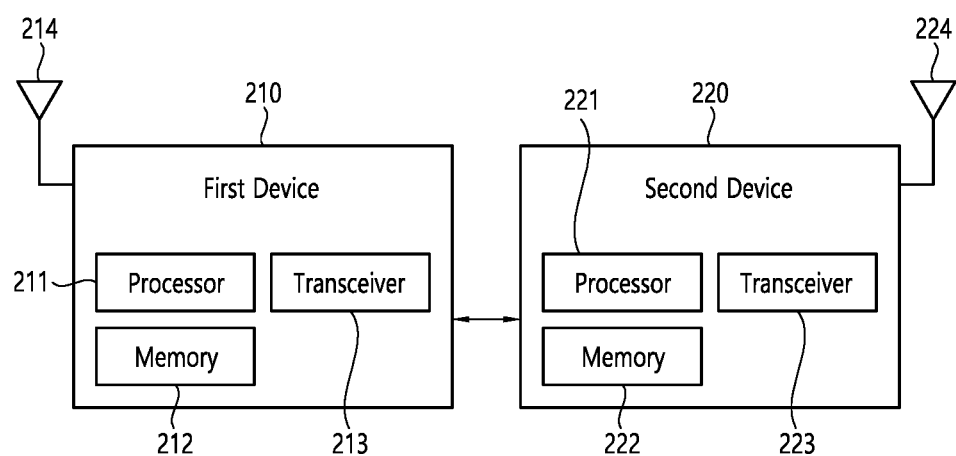
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
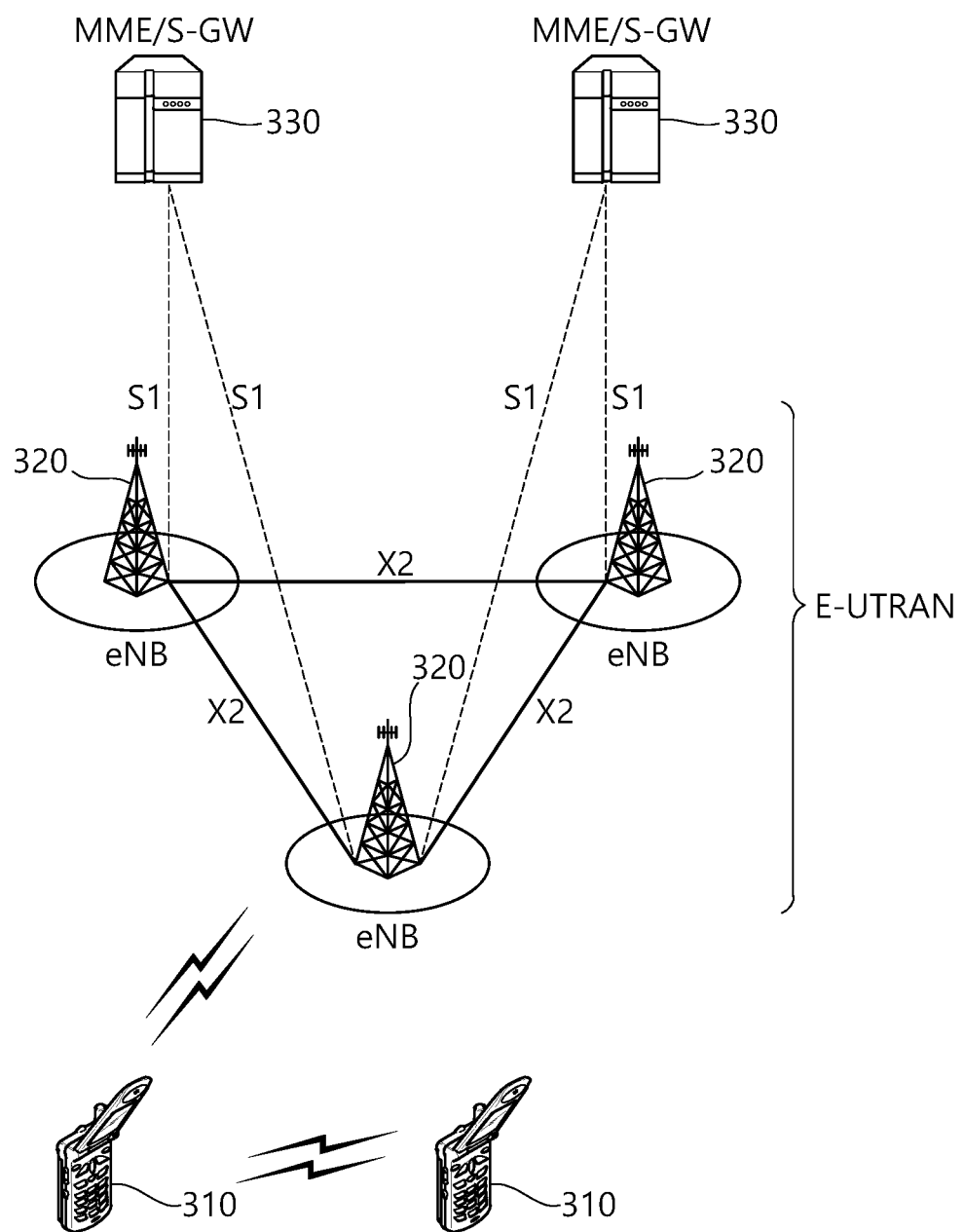
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UMTS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
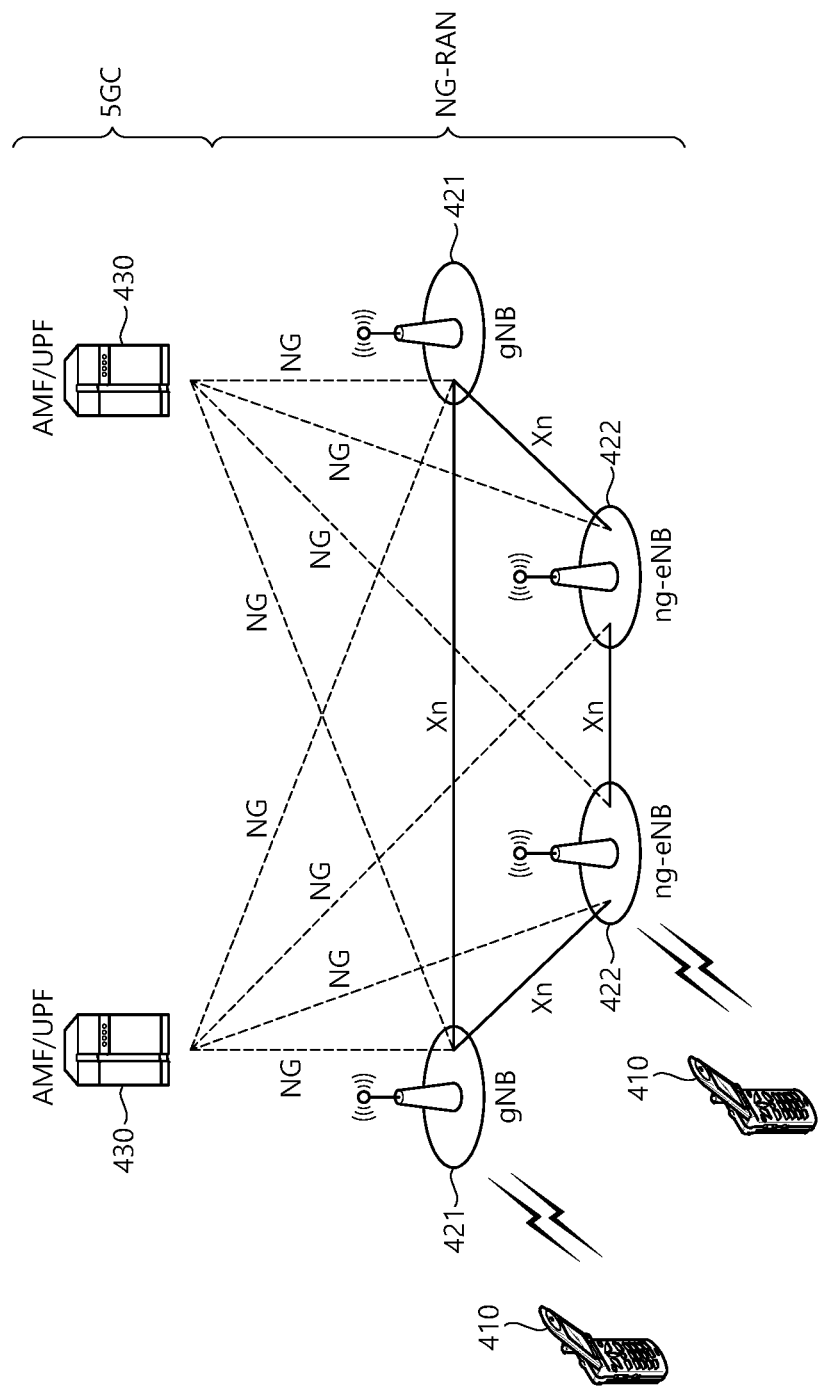
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
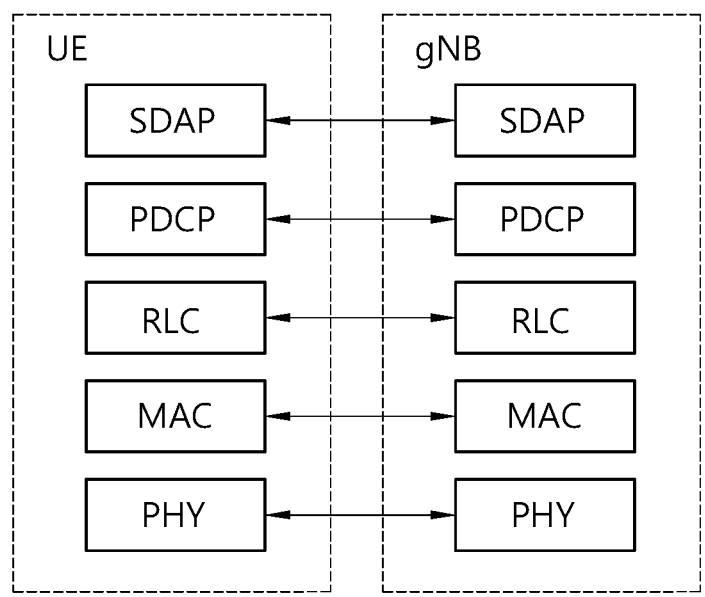
FIG. 5 shows a block diagram of a user plane protocol stack to which the technical features of the present disclosure can be applied.
Figure 6:
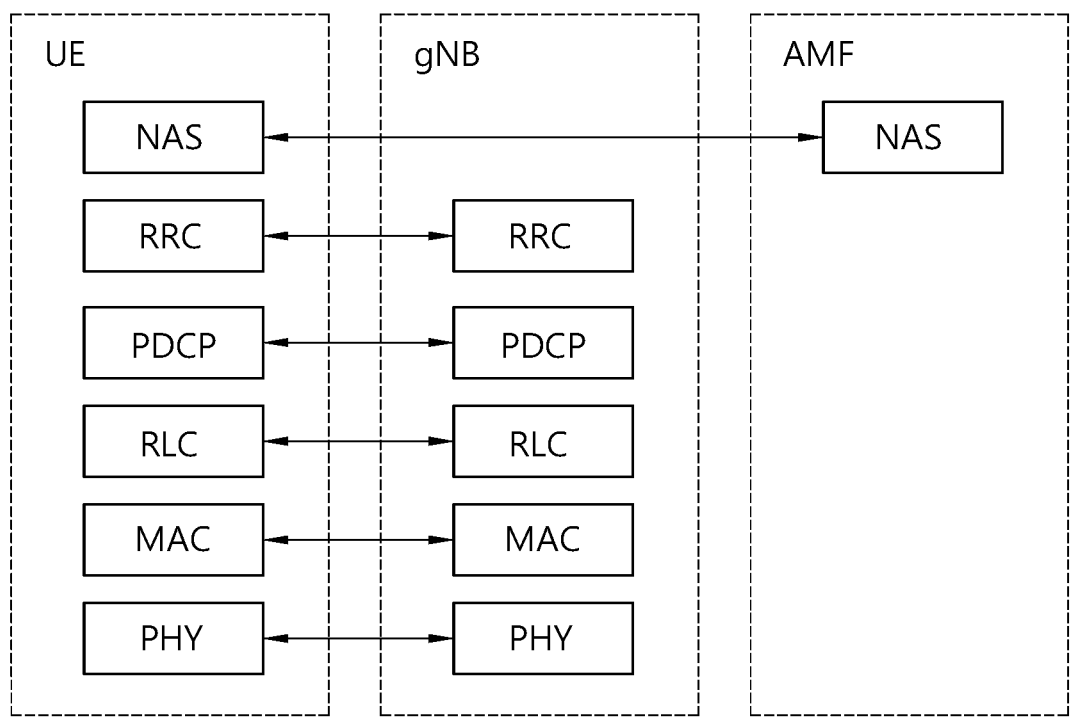
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell reselection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
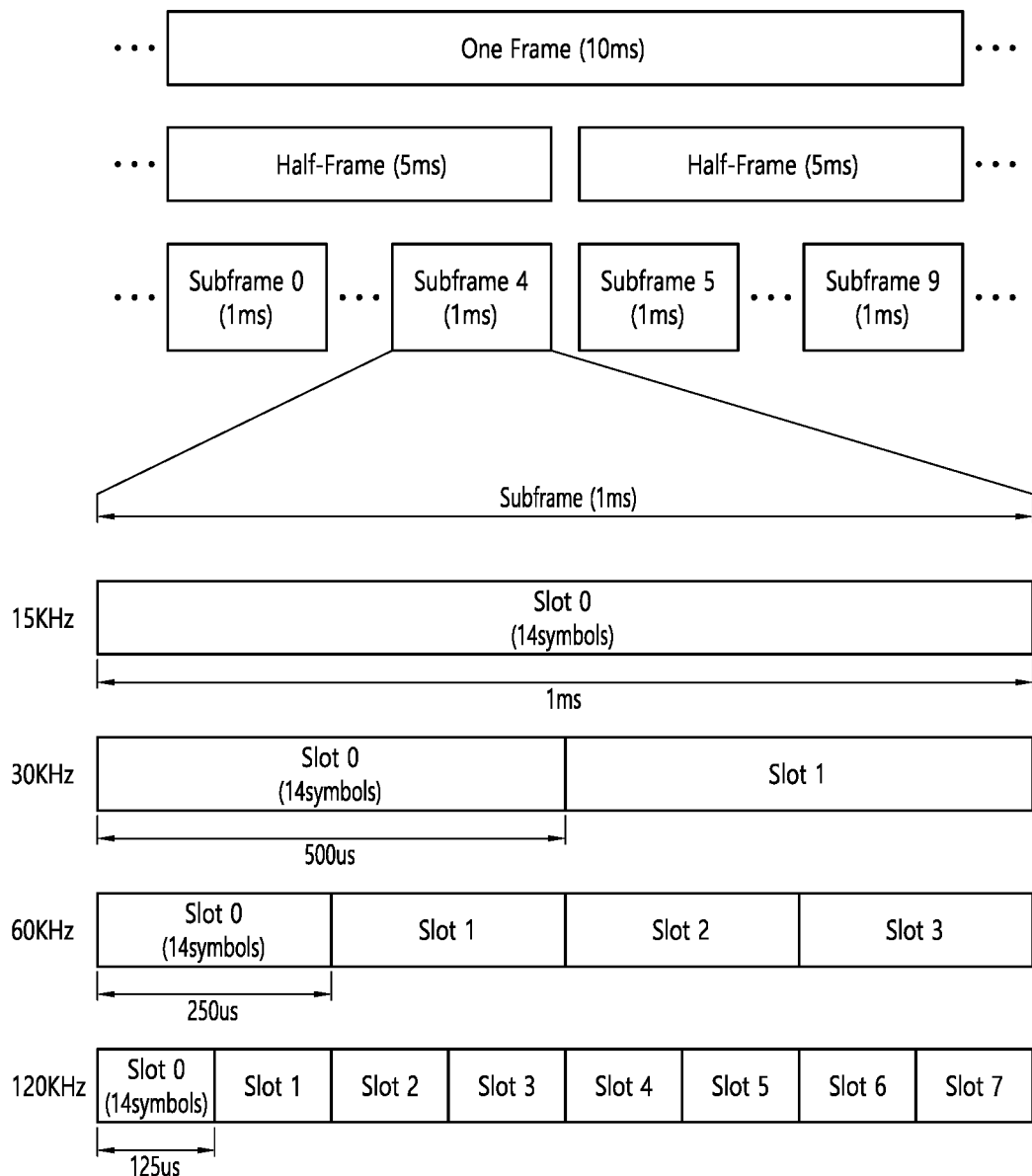
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f=2u*15$ kHz. The following table shows the number of OFDM symbols per slot, the number of slots per frame, and the number of slots per for the normal CP, according to the subcarrier spacing $\beta f=2u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\beta f=2u*15$ kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
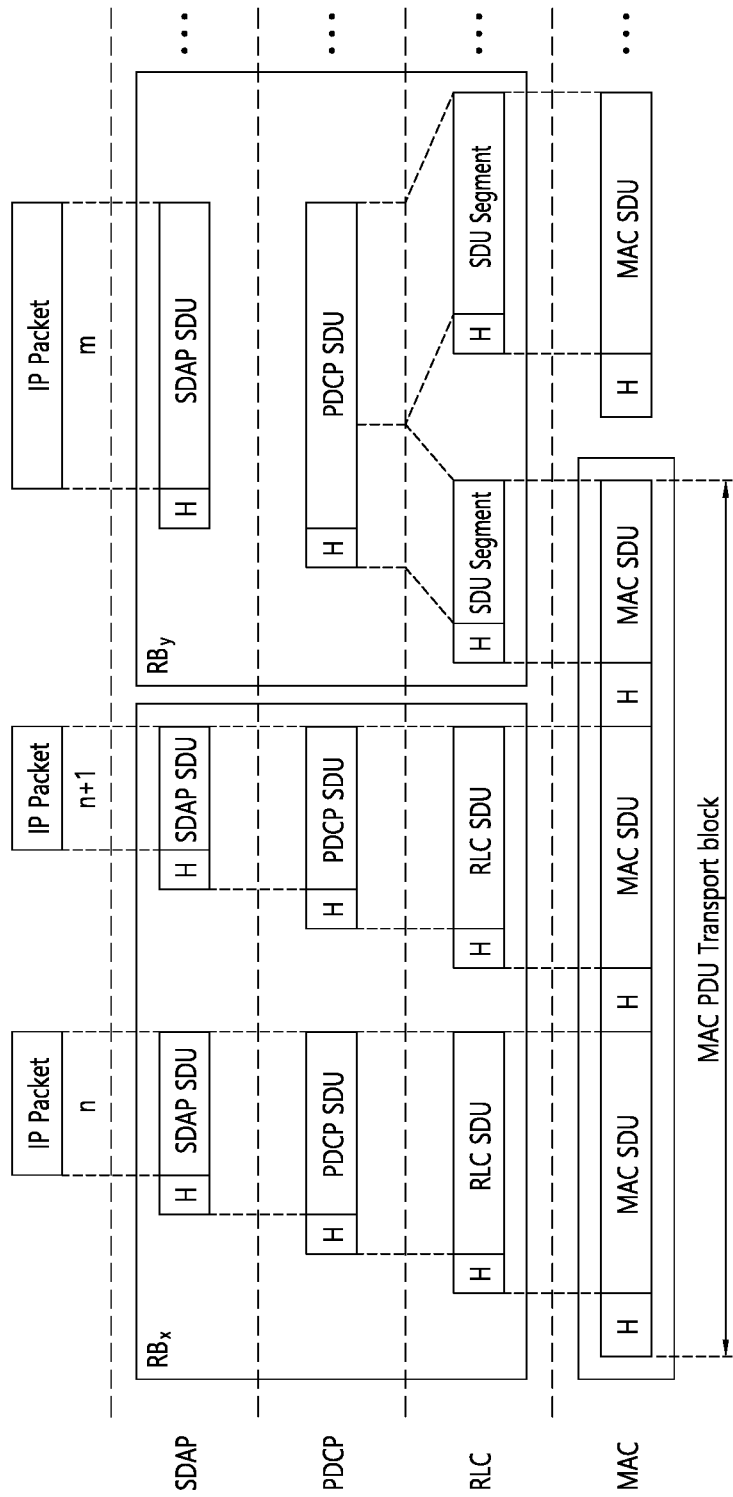
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Hereinafter, paging procedure is described.

The UE may use discontinuous reception (DRX) in RRC_IDLE and RRC_INACTIVE state in order to reduce power consumption. The UE may monitor one paging occasion (PO) per DRX cycle. A PO may be a set of PDCCH monitoring occasions and can comprise/consist of multiple time slots (e.g. subframe or OFDM symbol) where paging DCI can be sent. One paging frame (PF) may be one radio frame and may contain one or multiple PO(s) or starting point(s) of a PO.

In multi-beam operations, the UE may assume that the same paging message is repeated in all transmitted beams. The paging message may be same for both RAN initiated paging and core network (CN) initiated paging.

The UE may initiate RRC connection resume procedure upon receiving RAN initiated paging. If the UE receives a CN initiated paging in RRC_INACTIVE state, the UE may move to RRC_IDLE and inform NAS.

The PF and PO for paging may be determined by the following formulae:
1) SFN for the PF is determined by (SFN+PF_offset) mod T=(T div N)*(UE_ID mod N); and
2) Index (i_s), indicating the index of the PO is determined by i_s=floor (UE_ID/N) mod Ns. That is, PO may be determined based on the UE identifier, such as IMSI and 5G-S-TMSI.

The PDCCH monitoring occasions for paging may be determined according to pagingSearchSpace and firstPDCCH-MonitoringOccasionOfPO and nrofPDCCH-MonitoringOccasionPerSSB-InPO if configured. When SearchSpaceId=0 is configured for pagingSearchSpace, the PDCCH monitoring occasions for paging may be same as for remaining minimum system information (RMSI).

When SearchSpaceId=0 is configured for paging-SearchSpace, Ns may be either 1 or 2. For Ns=1, there may be only one PO which starts from the first PDCCH monitoring occasion for paging in the PF. For Ns=2, PO may be either in the first half frame (i_s=0) or the second half frame (i_s=1) of the PF.

When SearchSpaceId other than 0 is configured for pagingSearchSpace, the UE may monitor the (i_s+1)th PO. A PO may be a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The [x*S+K]th PDCCH monitoring occasion for paging in the PO may correspond to the Kth transmitted synchronization signal block (SSB), where x=0, 1, ..., X−1, K=1, 2, ..., S. The PDCCH monitoring occasions for paging which do not overlap with UL symbols (determined according to tdd-UL-DL-ConfigurationCommon) may be sequentially numbered from zero starting from the first PDCCH monitoring occasion for paging in the PF. When firstPDCCH-MonitoringOccasionOfPO is present, the starting PDCCH monitoring occasion number of (i_s+1)th PO may be the (i_s+1)th value of the firstPDCCH-MonitoringOccasionOfPO parameter; otherwise, it is equal to i_s*S*X. If X>1, when the UE detects a PDCCH transmission addressed to P-RNTI within its PO, the UE may not be required to monitor the subsequent PDCCH monitoring occasions for this PO.

A PO associated with a PF may start in the PF or after the PF.

The PDCCH monitoring occasions for a PO can span multiple radio frames. When SearchSpaceId other than 0 is configured for paging-SearchSpacem, the PDCCH monitoring occasions for a PO can span multiple periods of the paging search space.

The following parameters may be used for the calculation of PF and i_s above:
T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).
N: number of total paging frames in T
Ns: number of paging occasions for a PF
PF_offset: offset used for PF determination
UE_ID: 5G-S-TMSI mod 1024

Parameters Ns, nAndPagingFrameOffset, nrofPDCCH-MonitoringOccasionPerSSB-InPO, and the length of default DRX Cycle may be signaled in SIB1. The values of N and PF_offset may be derived from the parameter nAndPagingFrameOffset. The parameter first-PDCCH-MonitoringOccasionOfPO may be signalled in SIB1 for paging in initial DL BWP. For paging in a DL BWP other than the initial DL BWP, the parameter first-PDCCH-MonitoringOccasionOfPO may be signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string. 5G-S-TMSI shall in the formulae above be interpreted as a binary number where the left most bit represents the most significant bit.

Hereinafter, contents related to a multi-universal subscriber identity module (MUSIM) is described.

Multi-USIM devices (e.g., MUSIM device 910) have been more and more popular in different countries. The user may have both a personal and a business subscription in one device or have two personal subscriptions in one device for different services.

Figure 9:
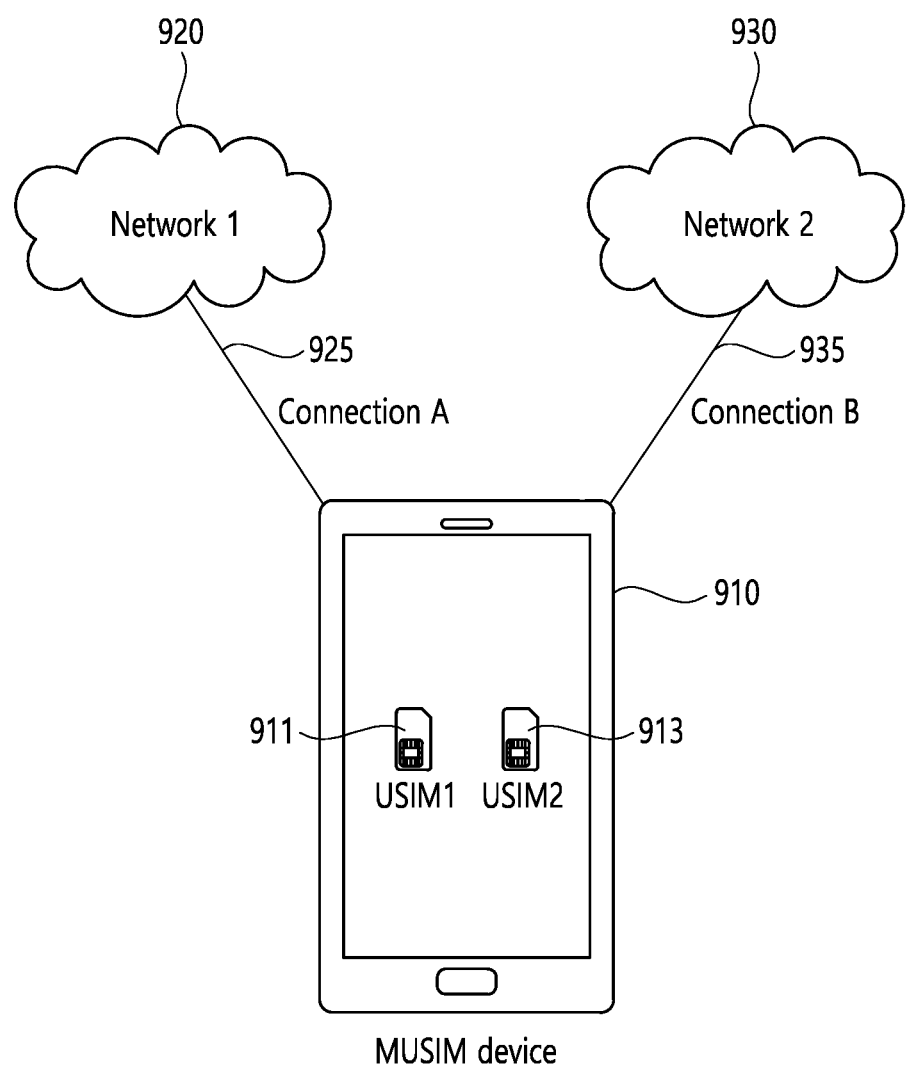
FIG. 9 shows an example of a wireless environment in which a MUSIM device operates according to an embodiment of the present disclosure.

FIG. 9 shows an example of a wireless environment in which a MUSIM device operates according to an embodiment of the present disclosure.

Referring to FIG. 9, MUSIM device 910 (or, MUSIM UE 910) may have a plurality of universal subscriber identity modules (USIMs)—USIM1 911 and USIM2 913. The MUSIM device 910 may register to a network 1 920 based on subscription information in the USIM1 911 to obtain a connection A 925 between the network 1 920 and the MUSIM device 910. The MSUIM device 910 may also register to a network 2 930 based on subscription information in the USIM2 913 to obtain a connection B 935 between the network 2 930 and the MUSIM device 910. The MUSIM device 910 may use the USIM1 911 to perform a communication with the network 1 920 over the connection A 925, and use the USIM2 913 to perform a communication with the network 2 930 over the connection B 935.

In a wireless environment in which a MUSIM device operates, the following properties may hold:
  Each registration from the USIMS of a MUSIM device may be handled independently.
  Each registered USIM in the MUSIM device may be associated with a dedicated international mobile equipment identity (IMEI)/permanent equipment identifier (PEI).
  A MUSIM UE may be connected with i) evolved packet system (EPS) on one USIM and 5G system (5GS) on the other USIM; ii) EPS on both USIMs; or iii) 5GS on both USIMs.
  A MUSIM UE may be a single reception (RX)/dual RX/single transmission (TX)/Dual TX UE. Single RX may allow the MUSIM UE to receive traffic from only one network at one time. Dual RX may allow the MUSIM UE to simultaneously receive traffic from two networks. Single TX may allow the MUSIM UE to transmit traffic to one network at one time. Dual TX may allow the MUSIM UE to simultaneously transmit traffic to two networks. The terms single RX/TX and Dual RX/TX do not refer to a device type. A single UE may, as an example, use Dual TX in some cases but Single TX in other case.
  If/when the multiple USIMs in the MUSIM device are served by different serving networks, network coordination between the serving networks may not be required.
  A MUSIM device with different USIMs may be camping with all USIMs on the same serving network RAN node, or the MUSIM device may be camping on different serving networks RAN nodes.
  USIMs may belong to same or different operators. Coordination between involved operators may not be required.
  USIM may be a physical SIM or embedded SIM (eSIM).

While actively communicating with a first system/network, a MUSIM UE may need to periodically monitor a second system/network (e.g. to synchronize, read the paging channel, perform measurements, or read the system information). The periodical activity on the second system may or may not have performance impact on the first system the UE is communicating with, depending on the UE implementation (i.e., single reception (Rx) or dual Rx).

In some cases, the UE equipped with different USIMs may have paging collisions which results in missed paging. When the UE receives a page in the second system while actively communicating with the first system, the UE may need to decide whether the UE should respond to this paging or not. When the UE decides to respond to the paging in the second system, the UE may need to stop the current activity in the first system. For example the first system may suspend or release the ongoing connection with the UE.

Multi-USIM device that is unable to simultaneously monitor paging on all RATs and/or systems in which the MUSIM device is in Idle state or RRC_Inactive state (for 5GS) may need to make a choice of the paging channel(s) to monitor which can lead to unsuccessful paging on the other paging channel(s). In some cases, the UE identifier values associated with the different USIMs can lead to systematic collisions which may result in corresponding missed pages. Therefore, resolving a paging conflict may be required. For example, MUSIM assistance information may be used to resolve the paging conflict.

When a UE detects the UE is operating as MUSIM UE (i.e., the UE has active registrations with >1 USIM), the UE may provide indication to PLMNs the UE registered with that the UE is a MUSIM UE.

The indication may be based on inclusion in a registration request, attach or TAU or service request messages of MUSIM assistance information.

If the UE becomes single USIM because only one registered USIM is left, when the UE registers with this USIM again in the related PLMN but the UE does not provide any indication, the UE may be a MUSIM UE (i.e., the UE does not include any assistance information). This registration may not need to wait for the next periodic or mobility related registration trigger.

When the AMF or MME receive assistance information, the AMF or MME may store the MUSIM assistance information in the UE context.

When some of the MUSIM assistance information is relevant for RRC_Inactive state, then the MUSIM assistance information may be provided to the RAN in PLMNs that support RRC-INACTIVE, when the UE context is configured in the RAN. The MUSIM assistance information may also be provided to the RAN in the N2 Paging message to trigger related behaviour in the RAN for paging.

The assistance information may include:
  1) Indication of the number or USIMs so the network may tune its paging strategy as it may e.g. modify the number of paging attempts based on its own policies. It may include indications of periodicity for UE reachability also (e.g. in terms of DRX cycles during which the UE can be reached (or periodicity etc, i.e., with reference to SFN DRX cycle zero is the first from the SFN=0 etc.).
  2) Indication of a Replacement UE_ID for paging or any other information RAN WGs may decide is relevant to modify the timing for PF/PO to avoid overlapping POs across USIMs. If this is a Replacement UE_ID, this is used in the RAN to compute the PF and PO for the UE. The page message itself is still related to the UE_ID the UE has obtained from the CN, but the Replacement ID is just used for paging PF/PO computation. Then there are no overlapping PF/PO across USIMs, then this information is not present. When the UE has provided a Replacement PF/PO, this is kept until this would create an overlapping PF/PO for the USIM, in which case the UE updates the network by e.g. omitting the information or by suggesting an alternate Replacement UE_ID. This Replacement UE_ID is passed to the RAN in the N2 Paging message for Idle mode, or to the RAN in the UE Context for storage when the UE is RRC-Inactive.

The UE may perform a MUSIM assistance information provision procedure. All or part of the MUSIM assistance information provision procedure may be performed in a registration procedure. For example, the UE may provide the MUSIM assistance information in a registration procedure, and a supporting network (i.e., access and mobility management function (AMF)) may acknowledges the reception of the MUSIM assistance information. The MUSIM assistance information provision procedure may be executed at any time whenever the UE needs to update the network with relevant MUSIM assistance information. If the UE is RRC connected with the other USIM in the same or another PLMN, the MUSIM assistance information provision procedure may first require creating a long enough gap in the RAN serving the other USIM.

When the UE does not need any more MUSIM Assistance information to be sent to the RAN, the UE may register without the MUSIM assistance information.

After the UE has provided MUSIM assistance information to the AMF, the AMF may perform a paging collision avoidance. The AMF may indicate to the UE that the paging collision avoidance procedure is requested by indicating MUSIM assistance information to the RAN.

The AMF may include the paging collision avoidance indication along with N2 paging message to RAN. RAN can decide the mechanism on how to avoid paging collision based on the received MUSIM assistance information.

The UE can request the RAN and CN to stop paging upon receiving a paging message by responding with a SR that includes a stop paging indication. The stop paging indication indication to stop paging may install a (potentially temporary) match all paging filter in the UE context in AMF and SMF that blocks DL paging. To lift this condition, the UE must update the MUSIM Assistance Information by a registration procedure including indication to either resume the earlier paging filter or a new paging filter or no paging filter. If the UE is RRC connected with the other USIM in the same or another PLMN, the stop paging procedure may first require creating a long enough gap in the RAN serving the other USIM.

The RAN may immediately release the connection when the RAN receives the stop paging indication in RRC MSG 5. The AMF does not establish any user plane when the MUSIM assistance information includes stop paging indication.

A PLMN may also be provisioned with a timer that lifts the effects of a stop paging indication, or the UE can provide a UE specific timer if the stop paging indication is used to indicate the intention of the UE to return within the specific time.

As stated above, when UE is registered to multiple networks, the UE may need to maintain connections with the multiple networks. If those registered networks cannot be coordinated with each other, the radio resources used in one registered network may collide with those used in the other registered networks or equivalently the UE capabilities used in the one registered network may collide with those used in the other registered networks. For example, if paging occasions in both networks collide with each other, UE can only monitor paging from either network A or network B, which may drop paging reception in the network that is not monitored.

Figure 10:
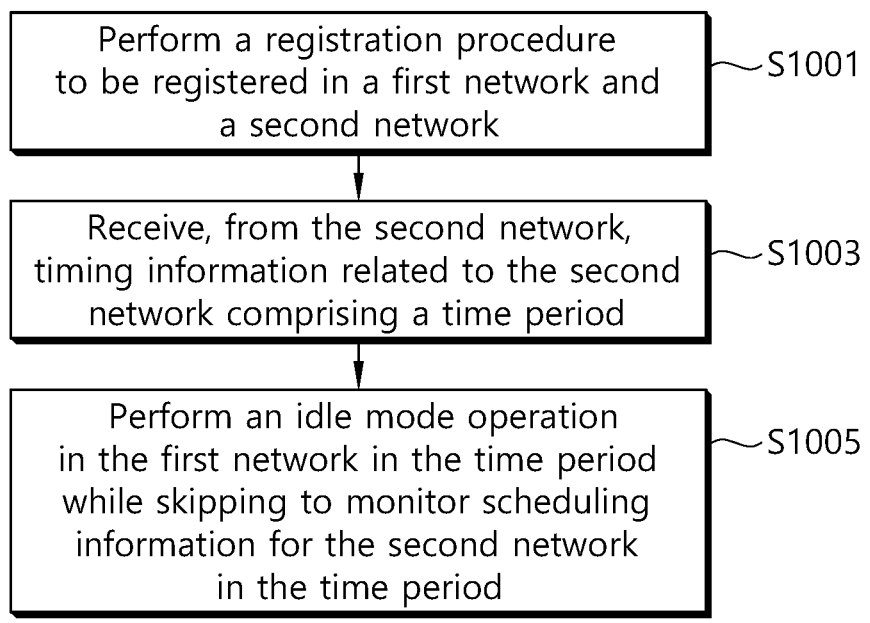
FIG. 10 shows an example of a method for performing an idle mode operation in one among multiple registered networks according to an embodiment of the present disclosure.

FIG. 10 shows an example of a method for performing an idle mode operation in one among multiple registered networks according to an embodiment of the present disclosure. Steps illustrated in FIG. 10 may be performed by a wireless device and/or a UE.

Referring to FIG. 10, in step S1001, the wireless device may perform a registration procedure to be registered in a first network and a second network.

In step S1003, the wireless device may receive, from the second network, timing information related to the second network comprising a time period.

In step S1005, the wireless device may perform an idle mode operation in the first network in the time period while skipping to monitor scheduling information for the second network in the time period. The idle mode operation may comprise at least one of monitoring a paging, performing a random access, or performing an idle mode measurement. The wireless device may perform the idle mode measurement for cell selection/reselection and/or for fast CA/DC activation upon entering RRC_CONNECTED.

According to various embodiments, the wireless device may be a multi-universal subscriber identity module (MUSIM) device equipped with a first USIM and a second USIM. The wireless device may register to the first network based on subscription information in the first USIM. The wireless device may register to the second network based on subscription information in the second USIM.

According to various embodiments, the timing information related to the second network may comprise a gap configuration for the second network. The time period may comprise at least one gap duration, at least one gap offset and/or gap periodicity included in the gap configuration for the second network. An example of the gap configuration may be a discontinuous reception (DRX) configuration for the second network. In this case, the time period may comprise a DRX idle period of a DRX cycle included in the DRX configuration for the second network.

According to various embodiments, the timing information related to the second network may comprise parameters representing a gap or a gap pattern for the second network. The gap can be represented by a gap duration and/or a gap offset. The gap offset is defined with respect to unambiguous timing reference of the second network such as subframe #0 within SFN #0. The gap pattern can be represented by a gap duration, a gap offset and/or a gap periodicity. The gap offset is defined with respect to unambiguous timing reference of the second network such as subframe zero within SFN zero.

According to various embodiments, the timing information related to the second network may comprise a configuration for multiple gaps or multiple gap patterns for the second network. For each gap or gap pattern, an index of the gap or gap pattern can be included in the gap pattern to uniquely identify the gap or the gap pattern of the configured gaps/gap patterns.

According to various embodiments, the scheduling information for the second network may comprise information informing at least one of resources allocated for receiving a downlink signal from the second network, or resources for transmitting an uplink signal to the second network. For example, the information may comprise DCI such as DL grant DCI and/or UL grant DCI.

According to various embodiments, the wireless device may transmit, to the second network, timing information related to the first network. The timing information related to the second network may be determined based on the timing information related to the first network.

According to various embodiments, the timing information related to the first network may comprise paging timing information including information on a time pattern for monitoring a paging in the first network, The time pattern may comprise at least one of a time offset, a time duration or a periodicity for monitoring the paging in the first network. The time pattern may be included in the time period.

According to various embodiments, the time pattern may be determined based on at least one of a paging frame (PF) for the first network or a paging occasion (PO) for the first network. The paging timing information may comprise at least one of information on the PF for the first network or information on the PO for the first network.

According to various embodiments, the wireless device may determine a PF for the second network by applying a PF offset so that the PF for the second network is different from that for the first network. The wireless device may determine a PO for the second network by applying a PO offset so that the PO for the second network is different from that for the first network. The wireless device may monitor a paging in the second network in a time pattern that is determined based on the PF for the second network and the PO for the second network.

According to various embodiments, information on the PF offset and information on the PO offset may be included in at least one of the timing information related to the second network, or paging adjustment information informed to the wireless device via a dedicated signalling.

According to various embodiments, the time pattern for monitoring the paging in the first network may be determined by taking a timing of the second network as a reference.

According to various embodiments, the time pattern for monitoring the paging in the first network may be determined by taking a timing of the first network as a reference. Information for a difference between the timing of the first network and a timing of the second network may be included in at least one of the paging timing information or additional information signalled to the second network.

According to various embodiments, the timing information related to the first network may comprise information on a time pattern for performing an idle mode measurement in the first network. The time pattern may comprise at least one of a time offset, time duration or a periodicity for performing the idle mode measurement in the first network. The time pattern may be included in the time period.

According to various embodiments, the timing information related to the first network may comprise information on a time pattern for performing a random access in the first network. The time pattern may comprise at least one of a time offset, a time duration or a periodicity for performing the random access in the first network. The time pattern may be included in the time period.

According to various embodiments, the wireless device may register to a first network and a second network. The wireless device may receive paging resource information from the second network via broadcast signalling. The wireless device may receive paging offset information from the second network via dedicated signalling. The paging offset information may comprise at least one of a UE specific paging frame offset or UE specific paging occasion offset. The wireless device may determine paging resources by calculating paging frame and index of paging occasion based on the paging offset information. The wireless device may monitor paging based on the determined paging resources in the second network.

Figure 11:
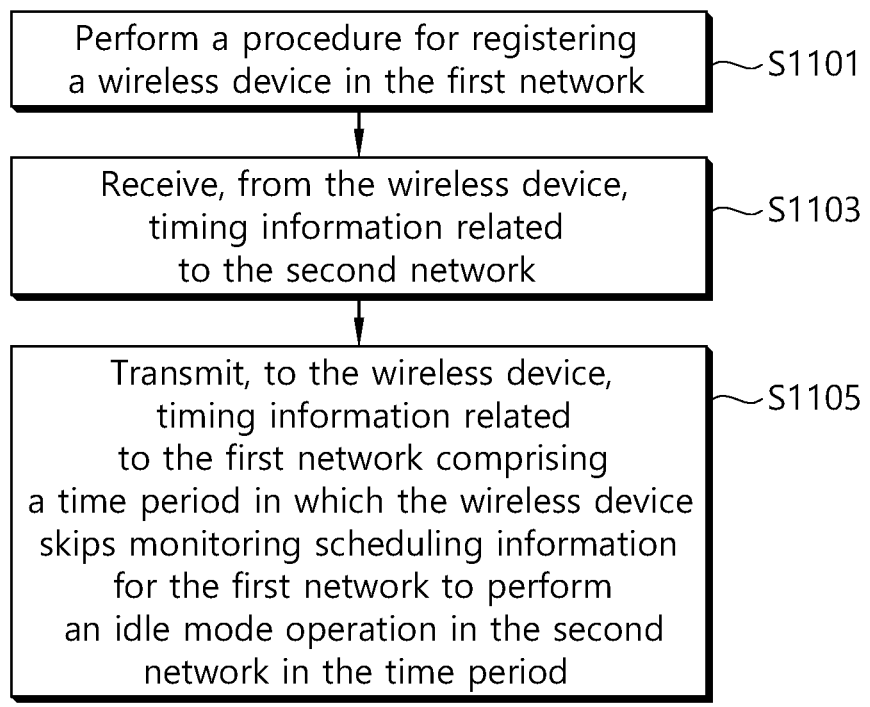
FIG. 11 shows an example of a method for providing a time period for an idle mode operation in one or more other networks according to an embodiment of the present disclosure.

FIG. 11 shows an example of a method for providing a time period for an idle mode operation in one or more other networks according to an embodiment of the present disclosure. Steps illustrated in FIG. 11 may be performed by a base station (BS) in a second network.

Referring to FIG. 11, in step S1101, the BS may perform a procedure for registering a wireless device in the second network. The wireless device may be registered in the second network and also a first network.

In step S1103, the BS may receive, from the wireless device, timing information related to the first network.

In step S1105, the BS may transmit, to the wireless device, timing information related to the second network. The timing information related to the second network may be determined based on the timing information related to the first network. The timing information related to the second network may comprise a time period in which the wireless device skips monitoring scheduling information for the second network to perform an idle mode operation in the first network in the time period. The idle mode operation may comprise at least one of monitoring a paging, performing a random access, or performing an idle mode measurement.

The BS in FIG. 11 may be an example of a second device 220 in FIG. 2, and therefore, steps of the BS as illustrated in FIG. 11 may be implemented by the second device 220. For example, the processor 221 may be configured to perform a procedure for registering a wireless device in the second network. The wireless device may be registered in the second network and also a first network. The processor 221 may be configured to control the transceiver 223 to receive, from the wireless device, timing information related to the first network. The processor 221 may be configured to control the transceiver 223 to transmit, to the wireless device, timing information related to the second network. The timing information related to the second network may be determined based on the timing information related to the first network. The timing information related to the second network may comprise a time period in which the wireless device skips monitoring scheduling information for the second network to perform an idle mode operation in the first network in the time period. The idle mode operation may comprise at least one of monitoring a paging, performing a random access, or performing an idle mode measurement.

Hereinafter, details of the present disclosure will be described.

According to some implementations of the present disclosure, UE may be registered to a first network and second network. The UE may be equipped with MUSIM including a first USIM and a second USIM. The UE may register to the first network based on subscription information in the first USIM, and register to the second network based on subscription information in the second USIM. The UE may use the first USIM for the first network and the second USIM for the second network. The UE may be RRC_IDLE in the first network, and the UE may be RRC_CONNECTED in the second network. The UE may be camping on a cell on a frequency of the first network. The UE may be RRC_CONNECTED in the first network.

According to some implementations of the present disclosure, the UE may acquire or determine information required for monitoring paging in the first network. For example, the UE may acquire or determine information on paging frames and paging occasions in the first network.

According to some implementations of the present disclosure, the UE may determine a measurement timing required for measurements on a cell quality in the first network. The measurement timing may comprise at least one time duration during which measurements can be performed. The measurement timing may further comprise a periodicity of the time duration. The UE may measure a timing difference between the first network and second network, by, e.g., referring to the timing of initial slot/subframe (e.g., slot/subframe zero) of the initial system frame number (SFN) i.e., SFN zero. The measurement timing may further comprise timing offset applied to the time duration with respect to the reference timing.

According to some implementations of the present disclosure, the UE may send inter-network information to the second network to indicate that paging resource collision happens between the second network and the other network (i.e., first network). The UE may send inter-network information to the second network to indicate whether the UE is camping on another network (e.g., the first network). The inter-network information may indicate whether the UE is in RRC_IDLE in another network. The inter-network information may indicate that the UE is in RRC_IDLE in another network. The inter-network information may indicate whether the UE is monitoring paging in another network.

According to some implementations of the present disclosure, the UE may send/update the inter-network information to the second network if the UE detects collision of paging resources, e.g., overlapping PO in both networks. The UE may send/update the inter-network information to the second network, upon change of the connection status in the first network. The UE may send the inter-network information, when registration to the first network is successful. The UE may send the inter-network information, when de-registration (or detach) from the first network has been performed. The UE may send the inter-network information, upon change of paging timing information in the first network. The UE may send the inter-network information, upon change of serving frequency in the first network. The UE may send the inter-network information when some contents in the inter-network information has changed since the inter-network information was previously reported to the second network. The UE may send the inter-network information upon change of primary cell (handover) in the second network. The UE may send the inter-network information to the second network via dedicated RRC signalling.

According to some implementations of the present disclosure, the UE may send the inter-network information to the second network when the UE is establishing RRC connection with the second network, by including the inter-network information in the RRC setup complete message. The UE may send the inter-network information to the second network when the UE is resuming RRC connection with the second network, by including the inter-network information in the RRC resume complete message. Since RRC resume complete message is security protected, inclusion of the inter-network information in the RRC resume complete message may be desirable in terms of security in case the inter-network information should be security-protected.

According to some implementations of the present disclosure, the second network may indicate that the second network supports UE-assisted resource coordination for multi-network operations to the UE. The UE may be allowed to send the inter-network information to the second network, only if the serving cell of the second network indicates that the second network supports UE-assisted resource coordination for multi-network operations. The serving cell of the second network may transmit the indication of supporting the UE-assisted resource coordination for multi-network operations via broadcast RRC signalling and/or dedicated RRC signalling. If the serving cell of the second network does not transmit the indication of supporting the UE-assisted resource coordination for multi-network operations, the UE does not send the inter-network information to the second network. Instead, the UE may send/update its capability information to the second network. The capability information may exclude the supported band combination that includes the serving frequency of the first network. If the serving frequency of the first network changes, the UE may send/update its capability information accordingly.

According to some implementations of the present disclosure, the inter-network information may include serving frequency information of the first network. The second network may use the serving frequency information of the first network to figure out which frequency/band combination can be configured to the UE in the first network/second network while helping the UE to maintain the connection of the UE in the first network on the indicated frequency of the first network, based on the supported frequency/band combination reported by the UE in the first network and the serving frequency of the second network. This may be enabled if the second network considers that the indicated frequency of the first network is a virtual serving frequency configured in the second network such that the second network configures the UE with configuration that uses band combination including the indicated frequency of the first network. The second network may configure the UE with a list of frequencies such that the UE is allowed to trigger sending the inter-network information only if the serving frequency of the first network is not in the list of frequencies.

According to some implementations of the present disclosure, the inter-network information may include paging timing information indicating the timing required for monitoring paging in the first network. The second network may use the paging timing information to avoid scheduling at the indicated timing such that the UE can receive paging in the first network. The second network may use the paging timing information to configure timing gap/gap pattern or discontinuous reception (DRX) for the UE such that the UE can temporarily skip DL monitoring in the second network and thus leave the second network during the timing gap/gap pattern or DRX idle period (or, DRX off period) and receive paging in the first network.

According to some implementations of the present disclosure, the inter-network information may include desired value of paging offset (e.g., additional PF offset and/or PO offset) to be applied for calculation of PF and PO (i_s) for paging reception in the second network. The UE may determine the desired value of paging offset such that paging occasion collisions between two networks can be avoided after applying the desired value of paging offset.

According to some implementations of the present disclosure, the inter-network information may include paging monitoring timing information. The paging monitoring timing information may be included in the paging timing information. The paging monitoring timing information may include paging frame (PF) information and paging occasion (PO) information. When constructing the paging monitoring timing information from the first network, the UE may take the timing of the second network as reference so that the paging monitoring timing information can be directly interpreted by the second network without figuring out the timing difference between the first network and second network.

Alternatively, when constructing paging monitoring timing information, the UE may take the timing of the first network as reference. In this case, the UE may also report timing information that enables the second network to calculate timing reference of the first network to apply to the received paging monitoring timing information. The timing information may be timing difference between the first network and second network. For example, the timing difference between the first network and second network may comprise SFN difference and/or subframe/slot timing or number difference.

According to some implementations of the present disclosure, the inter-network information may include time information required by the UE to perform idle mode measurements in the first network.

According to some implementations of the present disclosure, the inter-network information may include random access (RA) timing information indicating the timing required for performing random access procedure in the first network. The RA timing information may include time duration required to perform random access, where the time duration may start from the initiation of the random access procedure and to the completion of the random access procedure. Alternatively, the inter-network information or the RA timing information may indicate each time duration for each message transmission/reception. For example, the RA timing information may include time duration required to send message1 (PRACH preamble). For example, the RA timing information may include time duration required to receive message2 (random access response (RAR) on PDSCH). For example, the RA Timing information may include time duration required to send message3 (PUSCH). For example, the RA timing information may include time duration required to receive message4 (PDSCH). For example, the RA timing information may include time duration required to send message A (PRACH and PUSCH) in 2-step RACH procedure. For example, the RA timing information may include time duration required to receive message B (PDSCH) in 2-step RACH procedure. For example, the RA timing information may include timing at which each time duration appears.

According to some implementations of the present disclosure, the second network may configure the UE with an offset for PF calculation, denoted by PF_offset_2, for paging reception in the second network. The second network may configure the UE with an offset for PO index calculation, denoted by PO_offset, for paging reception in the second network. The offsets (i.e., PF_offset_2 and/or PO_offset) may be signalled via dedicated signalling. When the offsets are not signalled, default value of zero may be set for the offsets. With these PF_offset_2 and PO_offset, the PF and PO for paging reception in the second network may be determined by the following formulae:

1. PF determination
(1) Alternative 1
SFN for the PF may be determined by $$(SFN+PF\_offset+PF\_offset\_2) \bmod T = (T \div N)^*(UE\_ID \bmod N),$$

(2) Alternative 2
SFN for the PF may be determined by $$(SFN+PF\_offset) \bmod T = (T \div N)^*((UE\_ID+PF\_offset\_2) \bmod N).$$

2. PO index determination
(1) Alternative 1
Index i_s may be determined by $$i\_s = \mathrm{floor}((UE\_ID+PO\_offset)/N) \bmod Ns.$$

(2) Alternative 2
Index i_s may be determined by $$i\_s = (\mathrm{floor}(UE\_ID/N)+PO\_offset) \bmod Ns.$$

(3) Alternative 3
Index i_s may be determined by $$i\_s = (\mathrm{floor}(UE\_ID)/N \bmod Ns)+PO\_offset) \bmod Ns.$$

In the above formulae:
SFN is an SFN of a PF for the second network;
i_s is an index of a PO for the second network;
PF_offset is an offset used for determining a PF;
PF_offset_2 is an offset used for determining a PF for the second network;
PO_offset is an offset used for determining a PO for the second network;
T is a DRX cycle of the UE;
N is the number of total paging frames in T;
Ns is the number of paging occasions for a PF; and
UE_ID is an identifier of the UE, such as 5G-S-TMSI mod 1024.

The UE may monitor a paging in the second network by using PF and PO derived from the calculated SFN and i_s, where the PF_offset_2 and/or PO_offset are reflected.

According to some implementations of the present disclosure, the second network may configure the UE with a network ID (or frequency ID) information that indicates the target network or target paging monitoring to which the paging adjustment information (i.e., PF_offset_2 and/or PO_offset) should be applied.

According to some implementations of the present disclosure, during handover preparation for the UE in the second network, the source cell may send the inter-network information to the target cell. The target cell may take the inter-network information into account to decide UE configuration/radio resources to be used in the target cell such that the UE operation in the first network can be maintained after the handover.

According to some implementations of the present disclosure, the UE may receive timing information from the second network. The timing information may indicate when the UE is allowed to perform operations in the first network. The timing information may indicate when the UE is allowed to skip monitoring DL assignment and/or to skip operations necessary to keep RRC_CONNECTED in the second network. The timing information may comprise a configuration representing a gap or gap pattern. The UE may perform idle mode operations during the timing indicated by the timing information in the first network. The operations may refer to idle mode operation including at least paging monitoring or performing a random access or performing idle mode measurements.

According to some implementations of the present disclosure, the UE may receive activation or deactivation of at least one of gap or gap pattern among the configured gaps or gap patterns. The activation or deactivation command may be signalled to the UE by DCI or MAC Control Element or RRC message. The activation or deactivation command may include at least one field indicating activation or deactivation for a gap or a gap pattern. The activation or deactivation command may include an index of a gap or a gap pattern for which the field indicating activation or deactivation is applied. If there is at least one active gap or gap pattern, UE is allowed to skip monitoring DL assignment and to skip operations necessary to keep RRC_CONNECTED in the second network and perform the desired operations during the timing indicated by the active gap or gap pattern in the first network.

According to some implementations of the present disclosure, the UE may send information to the second network indicating a request for activation or deactivation of at least one gap or gap pattern. The request may include at least one field indicting activation request or deactivation request for a gap or a gap pattern. The request for activation or deactivation may include an index of a gap or a gap pattern for which the field requesting activation or deactivation is applied.

Figure 12:
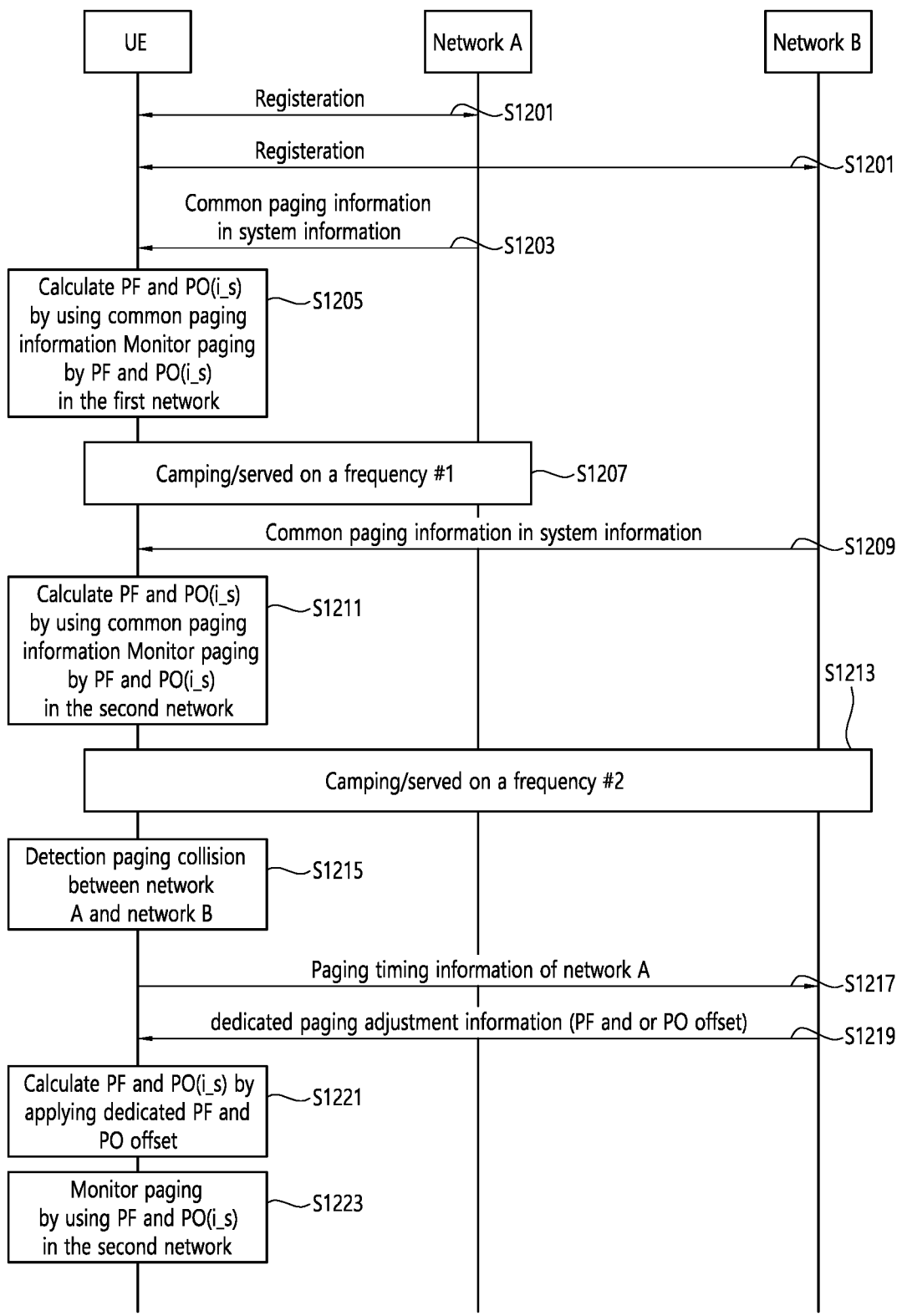
FIG. 12 shows an example of a paging occasion coordination between multiple networks according to an embodiment of the present disclosure.

FIG. 12 shows an example of a paging occasion coordination between multiple networks according to an embodiment of the present disclosure.

Referring to FIG. 12, in step S1201, the UE is registered to network A and network B.

In step S1203, the UE may receive common paging information via system information from the network A. The common paging information may comprise at least one of PF_offset which is an offset used for determining a PF; T which is a DRX cycle of the UE; N which is the number of total paging frames in T; Ns which is the number of paging occasions for a PF; or UE_ID which is an identifier of the UE, such as 5G-S-TMSI mod 1024.

In step S1205, the UE may calculate PF and PO by using the common paging information, and monitor a paging in the network A by using the calculated PF and PO. For example, the UE may determine an SFN of a PF for the network A as (SFN+PF_offset) mod T=(T div N)*(UE_ID mod N), and an index of a PO for the network A as i_s=floor (UE_ID/N) mod Ns.

In step S1207, the UE may be camping on a frequency #1 in network A.

In step S1209, the UE may receive common paging information via system information from the network B. The common paging information may comprise at least one of PF_offset which is an offset used for determining a PF; T which is a DRX cycle of the UE; N which is the number of total paging frames in T; Ns which is the number of paging occasions for a PF; or UE_ID which is an identifier of the UE, such as 5G-S-TMSI mod 1024.

In step S1211, the UE may calculate PF and PO by using the common paging information, and monitor a paging in the network B by using the calculated PF and PO. For example, the UE may determine an SFN of a PF for the network B as (SFN+PF_offset) mod T=(T div N)*(UE_ID mod N), and an index of a PO for the network B as i_s=floor (UE_ID/N) mod Ns.

In step S1213, the UE may be camping/served on a frequency #2 in network B.

In step S1215, the UE may detect paging occasion collisions between the network A and the network B.

In step S1217, the UE may transmit inter-network information to the network B. The inter-network information may include paging timing information of the network A. The paging timing information of the network A may comprise at least one of information for a PF for the network A, or information for a PO for the network A.

In step S1219, the UE may receive information on PF_offset and/or PO_offset via dedicated signalling from the network B. The PF_offset may comprise PF_offset_2 used for determining a PF for the network B, and the PO_offset may comprise PO_offset used for determining a PO for the network B.

In step S1221, the UE may calculate PF and PO by using the PF_offset and/or PO_offset. For example, the UE may determine the PF for the network B as one of alternatives 1 to 2 in the PF determination formula above, and the PO for the network B as one of alternative 1 to 3 in the PO determination formula above.

In step S1223, the UE may monitor a paging in the network B by using the calculated PF and PO for the network B.

Figure 13:
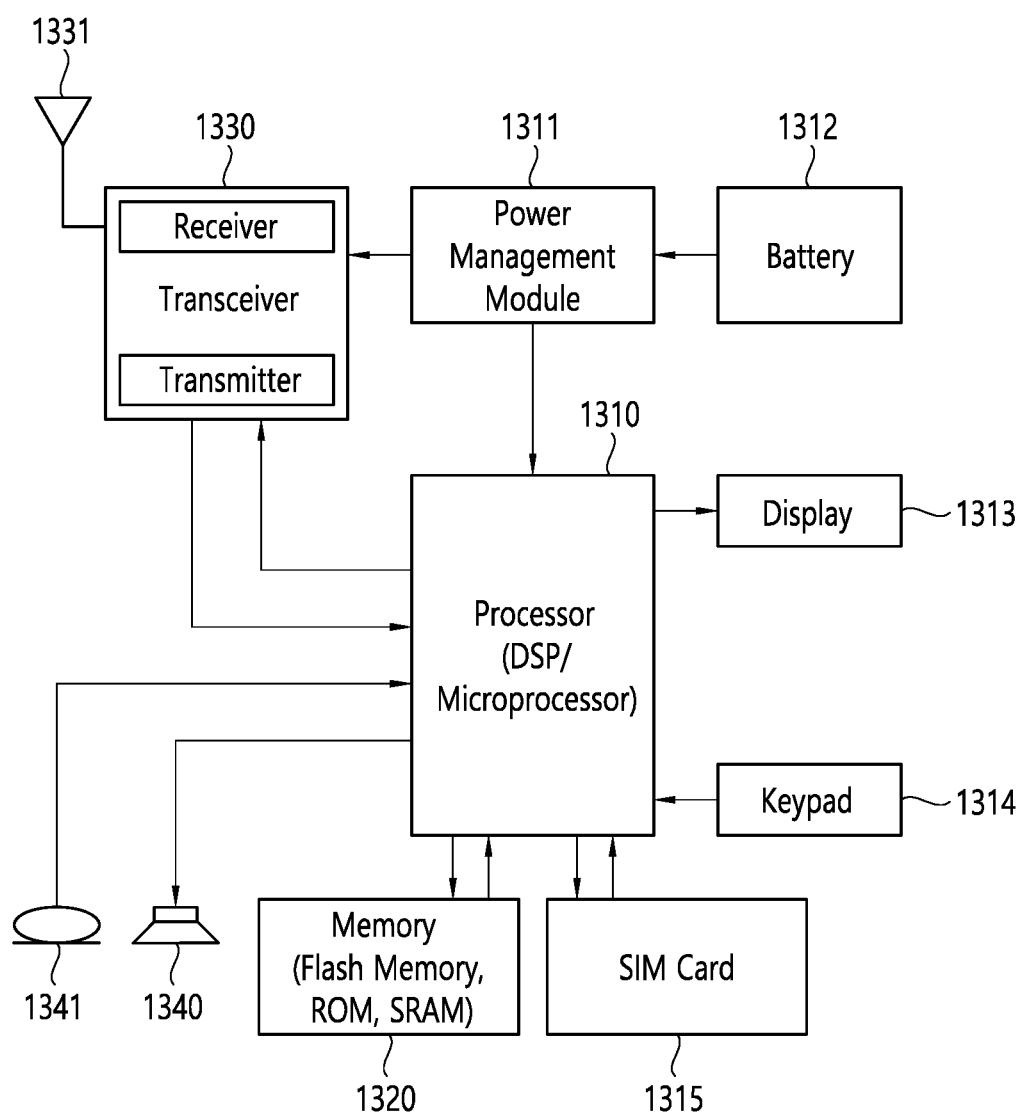
FIG. 13 shows a UE to implement an embodiment of the present disclosure.

FIG. 13 shows a UE to implement an embodiment of the present disclosure. The present disclosure described above for UE side may be applied to this embodiment. The UE in FIG. 13 may be an example of first device 213 as illustrated in FIG. 2.

A UE includes a processor 1310 (i.e., processor 211), a power management module 1311, a battery 1312, a display 1313, a keypad 1314, a subscriber identification module (SIM) card 1315, a memory 1320 (i.e., memory 212), a transceiver 1330 (i.e., transceiver 213), one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include application-specific integrated circuit (ASIC), other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, A series of processors made by Apple®, HELIO™ series of processors made by MediaTek® ATOM™ series of processors made by Intel® or a corresponding next generation processor.

The processor 1310 may be configured to, or configured to control the transceiver 1330 to implement steps performed by the UE and/or the wireless device throughout the disclosure.

The power management module 1311 manages power for the processor 1310 and/or the transceiver 1330. The battery 1312 supplies power to the power management module 1311. The display 1313 outputs results processed by the processor 1310. The keypad 1314 receives inputs to be used by the processor 1310. The keypad 1314 may be shown on the display 1313. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

According to various embodiments, the processor 1310 may be configured to, or configured to control the transceiver 1330 to implement steps performed by the UE and/or the wireless device throughout the disclosure. For example, the processor 1310 may be configured to perform a registration procedure to be registered in a first network and a second network. The processor 1310 may be configured to control the transceiver 1330 to receive, from the second network, timing information related to the second network comprising a time period. The processor 1310 may be configured to perform an idle mode operation in the first network in the time period while skipping to monitor scheduling information for the second network in the time period. The idle mode operation may comprise at least one of monitoring a paging, performing a random access, or performing an idle mode measurement.

According to various embodiments, the wireless device may be a multi-universal subscriber identity module (MUSIM) device equipped with a first USIM and a second USIM. The processor 1310 may be configured to register to the first network based on subscription information in the first USIM. The processor 1310 may be configured to register to the second network based on subscription information in the second USIM.

According to various embodiments, the timing information related to the second network may comprise a discontinuous reception (DRX) configuration for the second network. The time period may comprise a DRX idle period of a DRX cycle included in the DRX configuration for the second network.

According to various embodiments, the scheduling information for the second network may comprise information informing at least one of resources allocated for receiving a downlink signal from the second network, or resources for transmitting an uplink signal to the second network. For example, the information may comprise DCI such as DL assignment DCI and/or UL grant DCI.

According to various embodiments, the processor 1310 may be configured to control the transceiver 1330 to transmit, to the second network, timing information related to the first network. The timing information related to the second network may be determined based on the timing information related to the first network.

According to various embodiments, the timing information related to the first network may comprise paging timing information including information on a time pattern for monitoring a paging in the first network. The time pattern may comprise at least one of a time offset, a time duration or a periodicity for monitoring the paging in the first network. The time pattern may be included in the time period.

According to various embodiments, the time pattern may be determined based on at least one of a paging frame (PF) for the first network or a paging occasion (PO) for the first network. The paging timing information may comprise at least one of information on the PF for the first network or information on the PO for the first network.

According to various embodiments, the processor 1310 may be configured to determine a PF for the second network by applying a PF offset so that the PF for the second network is different from that for the first network. The processor 1310 may be configured to determine a PO for the second network by applying a PO offset so that the PO for the second network is different from that for the first network. The processor 1310 may be configured to monitor a paging in the second network in a time pattern that is determined based on the PF for the second network and the PO for the second network.

According to various embodiments, information on the PF offset and information on the PO_offset may be included in at least one of the timing information related to the second network, or paging adjustment information informed to the wireless device via a dedicated signalling.

According to various embodiments, the time pattern for monitoring the paging in the first network may be determined by taking a timing of the second network as a reference.

According to various embodiments, the time pattern for monitoring the paging in the first network may be determined by taking a timing of the first network as a reference. Information for a difference between the timing of the first network and a timing of the second network may be included in at least one of the paging timing information or additional information signalled to the second network.

According to various embodiments, the timing information related to the first network may comprise information on a time pattern for performing an idle mode measurement in the first network. The time pattern may comprise at least one of a time offset, a time duration or a periodicity for performing the idle mode measurement in the first network. The timing may be included in the time period.

According to various embodiments, the timing information related to the first network may comprise information on a time pattern for performing a random access in the first network. The time pattern may comprise at least one of a time offset, a time duration or a periodicity for performing the random access in the first network. The timing may be included in the time period.

Figure 14:
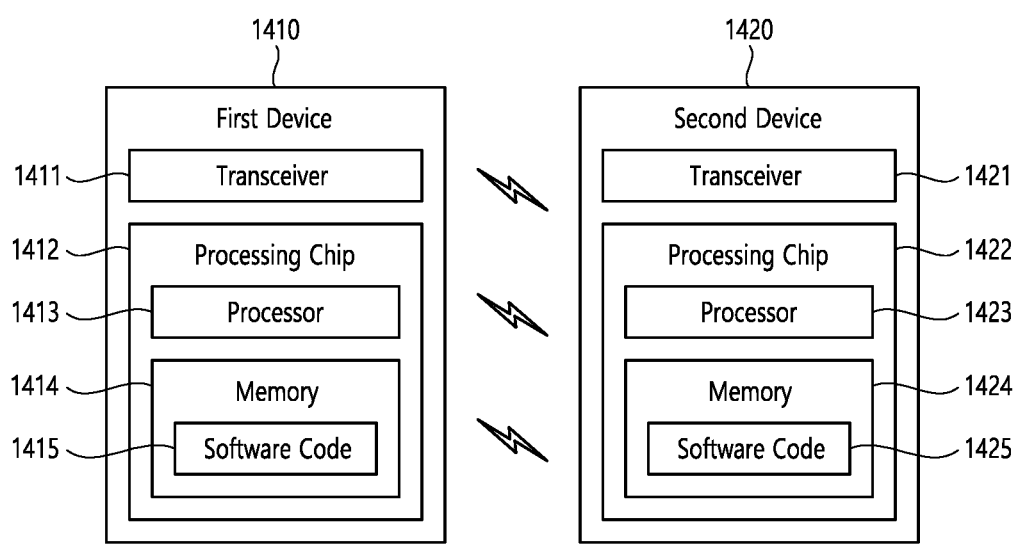
FIG. 14 shows another example of a wireless communication system to which the technical features of the present disclosure can be applied.

FIG. 14 shows another example of a wireless communication system to which the technical features of the present disclosure can be applied.

Referring to FIG. 14, the wireless communication system may include a first device 1410 (i.e., first device 210) and a second device 1420 (i.e., second device 220).

The first device 1410 may include at least one transceiver, such as a transceiver 1411, and at least one processing chip, such as a processing chip 1412. The processing chip 1412 may include at least one processor, such a processor 1413, and at least one memory, such as a memory 1414. The memory may be operably connectable to the processor 1413. The memory 1414 may store various types of information and/or instructions. The memory 1414 may store a software code 1415 which implements instructions that, when executed by the processor 1413, perform operations of the first device 910 described throughout the disclosure. For example, the software code 1415 may implement instructions that, when executed by the processor 1413, perform the functions, procedures, and/or methods of the first device 1410 described throughout the disclosure. For example, the software code 1415 may control the processor 1413 to perform one or more protocols. For example, the software code 1415 may control the processor 1413 to perform one or more layers of the radio interface protocol.

The second device 1420 may include at least one transceiver, such as a transceiver 1421, and at least one processing chip, such as a processing chip 1422. The processing chip 1422 may include at least one processor, such a processor 1423, and at least one memory, such as a memory 1424. The memory may be operably connectable to the processor 1423. The memory 1424 may store various types of information and/or instructions. The memory 1424 may store a software code 1425 which implements instructions that, when executed by the processor 1423, perform operations of the second device 1420 described throughout the disclosure. For example, the software code 1425 may implement instructions that, when executed by the processor 1423, perform the functions, procedures, and/or methods of the second device 1420 described throughout the disclosure. For example, the software code 1425 may control the processor 1423 to perform one or more protocols. For example, the software code 1425 may control the processor 1423 to perform one or more layers of the radio interface protocol.

According to various embodiments, the first device 1410 as illustrated in FIG. 14 may comprise a wireless device. The wireless device may comprise a transceiver 1411, a processing chip 1412. The processing chip 1412 may comprise a processor 1413, and a memory 1414. The memory 1414 may be operably connectable to the processor 1413. The memory 1414 may store various types of information and/or instructions. The memory 1414 may store a software code 1415 which implements instructions that, when executed by the processor 1413, perform operations comprising: performing a registration procedure to be registered in a first network and a second network; receiving, from the second network, timing information related to the second network comprising a time period; and performing an idle mode operation in the first network in the time period while skipping to monitor scheduling information for the second network in the time period, wherein the idle mode operation comprises at least one of: monitoring a paging; performing a random access; or performing an idle mode measurement.

According to various embodiments, a non-transitory computer-readable medium has stored thereon a plurality of instructions. The plurality of instructions, when executed by a processor of a wireless device, may cause the wireless device to: perform a registration procedure to be registered in a first network and a second network, receive, from the second network, timing information related to the second network comprising a time period, and perform an idle mode operation in the first network in the time period while skipping to monitor scheduling information for the second network in the time period, wherein the idle mode operation comprises at least one of: monitoring a paging; performing a random access; or performing an idle mode measurement.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 15:
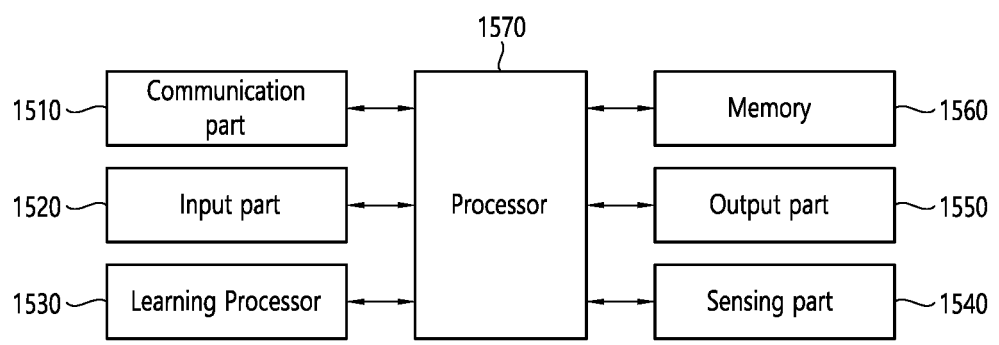
FIG. 15 shows an example of an AI device to which the technical features of the present disclosure can be applied.

FIG. 15 shows an example of an AI device to which the technical features of the present disclosure can be applied.

The AI device 1500 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 15, the AI device 1500 may include a communication part 1510, an input part 1560, a learning processor 1530, a sensing part 1540, an output part 1550, a memory 1560, and a processor 1570.

The communication part 1510 can transmit and/or receive data to and/or from external devices such as the AI devices and the AI server using wire and/or wireless communication technology. For example, the communication part 1510 can transmit and/or receive sensor information, a user input, a learning model, and a control signal with external devices. The communication technology used by the communication part 1510 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1560 can acquire various kinds of data. The input part 1560 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1560 can acquire input data to be used when acquiring an output using learning data and a learning model for model learning. The input part 1560 may obtain raw input data, in which case the processor 1570 or the learning processor 1530 may extract input features by preprocessing the input data.

The learning processor 1530 may learn a model composed of an ANN using learning data. The learned ANN can be referred to as a learning model. The learning model can be used to infer result values for new input data rather than learning data, and the inferred values can be used as a basis for determining which actions to perform. The learning processor 1530 may perform AI processing together with the learning processor of the AI server. The learning processor 1530 may include a memory integrated and/or implemented in the AI device 1500. Alternatively, the learning processor 1530 may be implemented using the memory 1560, an external memory directly coupled to the AI device 1500, and/or a memory maintained in an external device.

The sensing part 1540 may acquire at least one of internal information of the AI device 1500, environment information of the AI device 1500, and/or the user information using various sensors. The sensors included in the sensing part 1540 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1550 may generate an output related to visual, auditory, tactile, etc. The output part 1550 may include a display unit for outputting visual information, a speaker for outputting auditory information, and/or a haptic module for outputting tactile information.

The memory 1560 may store data that supports various functions of the AI device 1500. For example, the memory 1560 may store input data acquired by the input part 1560, learning data, a learning model, a learning history, etc.

The processor 1570 may determine at least one executable operation of the AI device 1500 based on information determined and/or generated using a data analysis algorithm and/or a machine learning algorithm. The processor 1570 may then control the components of the AI device 1500 to perform the determined operation. The processor 1570 may request, retrieve, receive, and/or utilize data in the learning processor 1530 and/or the memory 1560, and may control the components of the AI device 1500 to execute the predicted operation and/or the operation determined to be desirable among the at least one executable operation. The processor 1570 may generate a control signal for controlling the external device, and may transmit the generated control signal to the external device, when the external device needs to be linked to perform the determined operation. The processor 1570 may obtain the intention information for the user input and determine the user's requirements based on the obtained intention information. The processor 1570 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1530 and/or learned by the learning processor of the AI server, and/or learned by their distributed processing.

The processor 1570 may collect history information including the operation contents of the AI device 1500 and/or the user's feedback on the operation, etc. The processor 1570 may store the collected history information in the memory 1560 and/or the learning processor 1530, and/or transmit to an external device such as the AI server. The collected history information can be used to update the learning model. The processor 1570 may control at least some of the components of AI device 1500 to drive an application program stored in memory 1560. Furthermore, the processor 1570 may operate two or more of the components included in the AI device 1500 in combination with each other for driving the application program.

Figure 16:
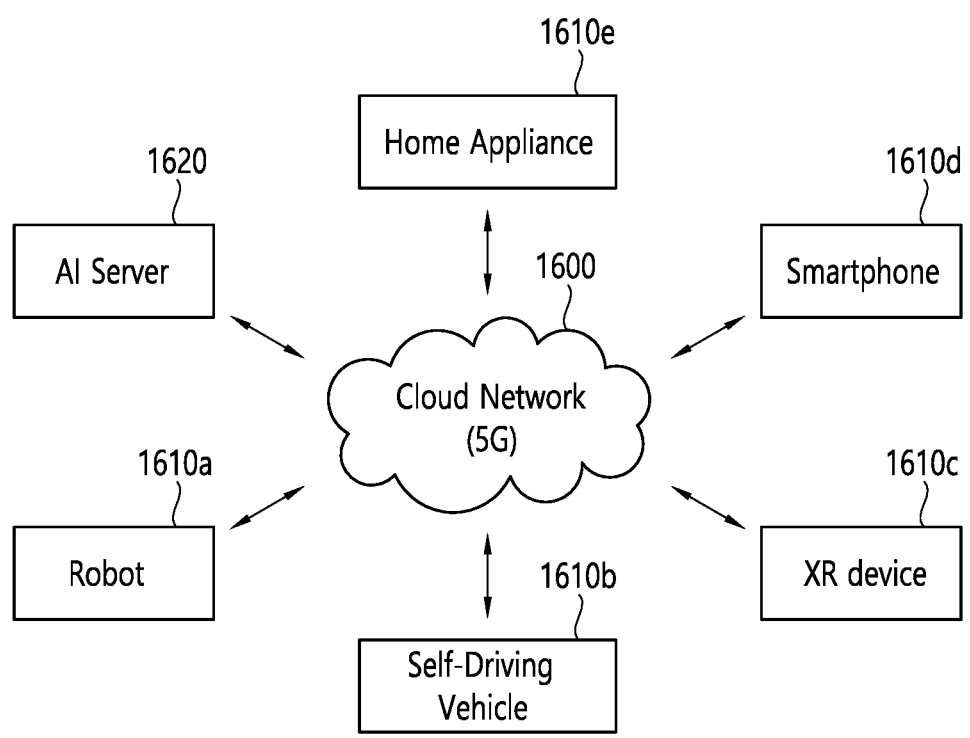
FIG. 16 shows an example of an AI system to which the technical features of the present disclosure can be applied.

FIG. 16 shows an example of an AI system to which the technical features of the present disclosure can be applied.

Referring to FIG. 16, in the AI system, at least one of an AI server 1620, a robot 1610*a*, an autonomous vehicle 1610*b*, an XR device 1610*c*, a smartphone 1610*d* and/or a home appliance 1610*e* is connected to a cloud network 1600. The robot 1610*a*, the autonomous vehicle 1610*b*, the XR device 1610*c*, the smartphone 1610*d*, and/or the home appliance 1610*e* to which the AI technology is applied may be referred to as AI devices 1610*a* to 1610*e*.

The cloud network 1600 may refer to a network that forms part of a cloud computing infrastructure and/or resides in a cloud computing infrastructure. The cloud network 1600 may be configured using a 3G network, a 4G or LTE network, and/or a 5G network. That is, each of the devices 1610*a* to 1610*e* and 1620 consisting the AI system may be connected to each other through the cloud network 1600. In particular, each of the devices 1610*a* to 1610*e* and 1620 may communicate with each other through a base station, but may directly communicate with each other without using a base station.

The AI server 1620 may include a server for performing AI processing and a server for performing operations on big data. The AI server 1620 is connected to at least one or more of AI devices constituting the AI system, i.e. the robot 1610*a*, the autonomous vehicle 1610*b*, the XR device 1610*c*, the smartphone 1610*d* and/or the home appliance 1610*e* through the cloud network 1600, and may assist at least some AI processing of the connected AI devices 1610*a* to 1610*e*. The AI server 1620 can learn the ANN according to the machine learning algorithm on behalf of the AI devices 1610*a* to 1610*e*, and can directly store the learning models and/or transmit them to the AI devices 1610*a* to 1610*e*. The AI server 1620 may receive the input data from the AI devices 1610*a* to 1610*e*, infer the result value with respect to the received input data using the learning model, generate a response and/or a control command based on the inferred result value, and transmit the generated data to the AI devices 1610*a* to 1610*e*. Alternatively, the AI devices 1610*a* to 1610*e* may directly infer a result value for the input data using a learning model, and generate a response and/or a control command based on the inferred result value.

Various embodiments of the AI devices 1610*a* to 1610*e* to which the technical features of the present disclosure can be applied will be described. The AI devices 1610*a* to 1610*e* shown in FIG. 16 can be seen as specific embodiments of the AI device 1500 shown in FIG. 15.

The present disclosure can have various advantageous effects.

For example, collision between resources from multiple networks to which a UE is registered can be avoided.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
performing a registration procedure to be registered in a first network and a second network;
receiving, from the second network, timing information related to the second network comprising a time period; and
performing an idle mode operation in the first network in the time period while skipping to monitor scheduling information for the second network in the time period,
wherein the idle mode operation comprises at least one of:
monitoring a paging;
performing a random access; or
performing an idle mode measurement.

2. The method of claim 1, wherein the timing information related to the second network comprises a gap configuration for the second network, and
wherein the time period comprises at least one gap duration, at least one gap offset and/or gap periodicity included in the gap configuration for the second network.

3. The method of claim 1, wherein the scheduling information for the second network comprises information informing at least one of resources allocated for receiving a downlink signal from the second network, or resources for transmitting an uplink signal to the second network.

4. The method of claim 1, further comprising:
transmitting, to the second network, timing information related to the first network,
wherein the timing information related to the second network is determined based on the timing information related to the first network.

5. The method of claim 4, wherein the timing information related to the first network comprises paging timing information including information on a time pattern for monitoring a paging in the first network,
wherein the time pattern comprises at least one of a time offset, a time duration or a periodicity for monitoring the paging in the first network, and
wherein the time pattern is included in the time period.

6. The method of claim 5, wherein the time pattern is determined based on at least one of a paging frame (PF) for the first network or a paging occasion (PO) for the first network, and
wherein the paging timing information comprises at least one of information on the PF for the first network or information on the PO for the first network.

7. The method of claim 6, further comprising:
determining a PF for the second network by applying a PF offset so that the PF for the second network is different from that for the first network;
determining a PO for the second network by applying a PO offset so that the PO for the second network is different from that for the first network; and
monitoring a paging in the second network in a time pattern that is determined based on the PF for the second network and the PO for the second network.

8. The method of claim 7, wherein information on the PF offset and information on the PO offset are included in at least one of the timing information related to the second network, or paging adjustment information informed to the wireless device via a dedicated signalling.

9. The method of claim 5, wherein the time pattern for monitoring the paging in the first network is determined by taking a timing of the second network as a reference.

10. The method of claim 5, wherein the time pattern for monitoring the paging in the first network is determined by taking a timing of the first network as a reference, and
wherein information for a difference between the timing of the first network and a timing of the second network is included in at least one of the paging timing information or additional information signalled to the second network.

11. The method of claim 4, wherein the timing information related to the first network comprises information on a time pattern for performing an idle mode measurement in the first network,
wherein the time pattern comprises at least one of a time offset, a time duration or a periodicity for performing the idle mode measurement in the first network, and
wherein the time pattern is included in the time period.

12. The method of claim 4, wherein the timing information related to the first network comprises information on a time pattern for performing a random access in the first network,
wherein the time pattern comprises at least one of a time offset, a time duration or a periodicity for performing the random access in the first network, and
wherein the time pattern is included in the time period.

13. The method of claim 1, wherein the wireless device is in communication with at least one of a user equipment, a network, or autonomous vehicles other than the wireless device.

14. A wireless device in a wireless communication system comprising:
a transceiver;
a memory; and
at least one processor operatively coupled to the transceiver and the memory, and configured to:

perform a registration procedure to be registered in a first network and a second network, control the transceiver to receive, from the second network, timing information related to the second network comprising a time period, and perform an idle mode operation in the first network in the time period while skipping to monitor scheduling information for the second network in the time period, wherein the idle mode operation comprises at least one of:

monitoring a paging;

performing a random access; or performing an idle mode measurement.

15. A base station (BS) in a first network in a wireless communication, the BS comprising:

a transceiver;

a memory; and at least one processor operatively coupled to the memory and the transceiver, wherein the at least one processor is configured to:

perform a procedure for registering a wireless device in the first network, wherein the wireless device is registered in the first network and a second network, control the transceiver to receive, from the wireless device, timing information related to the second network, and control the transceiver to transmit, to the wireless device, timing information related to the first network comprising a time period in which the wireless device skips monitoring scheduling information for the first network to perform an idle mode operation in the second network in the time period, wherein the timing information related to the first network is determined based on the timing information related to the second network, and wherein the idle mode operation comprises at least one of:

monitoring a paging;

performing a random access; or performing an idle mode measurement.

* * * * *